United States Patent

[11] 3,604,888

[72] Inventors Richard G. Friess
San Marcos;
Tor Hougen, Oceanside, both of, Calif.
[21] Appl. No. 14,421
[22] Filed Feb. 26, 1970
[45] Patented Sept. 14, 1971
[73] Assignee Hughes Aircraft Company
Culver City, Calif.

[54] WELD CONTROL CIRCUIT
3 Claims, 1 Drawing Fig.

[52] U.S. Cl. .................................................. 219/113
[51] Int. Cl. .................................................. B23k 11/26
[50] Field of Search.......................................... 219/108–
116, 50; 307/106; 323/1

[56] References Cited
UNITED STATES PATENTS
3,436,514  4/1969  Broomhall et al. ........... 219/113
3,485,987  12/1969  Porterfield ................... 219/113

FOREIGN PATENTS
217,557  8/1968  U.S.S.R. ........................ 219/113

OTHER REFERENCES
" Current Interruption and A.C. Turn-Off Circuits," G.E. Silicon Controlled Rectifier Manual, Second Edition, 1961, p. 72.

*Primary Examiner*—J. V. Truhe
*Assistant Examiner*—J. G. Smith
*Attorneys*—James K. Haskell and Allen A. Dicke, Jr.

ABSTRACT: A charged capacitor is connected in series with a pulse welder transformer primary and a switching SCR. The weld control circuit is connected to fire the SCR, when the weld pulse is required. A transistor connected across the SCR shunts the SCR to positively reduce the SCR current below its holding current value. The SCR current is measured so that the transistor is not turned on until the current is at a safe value.

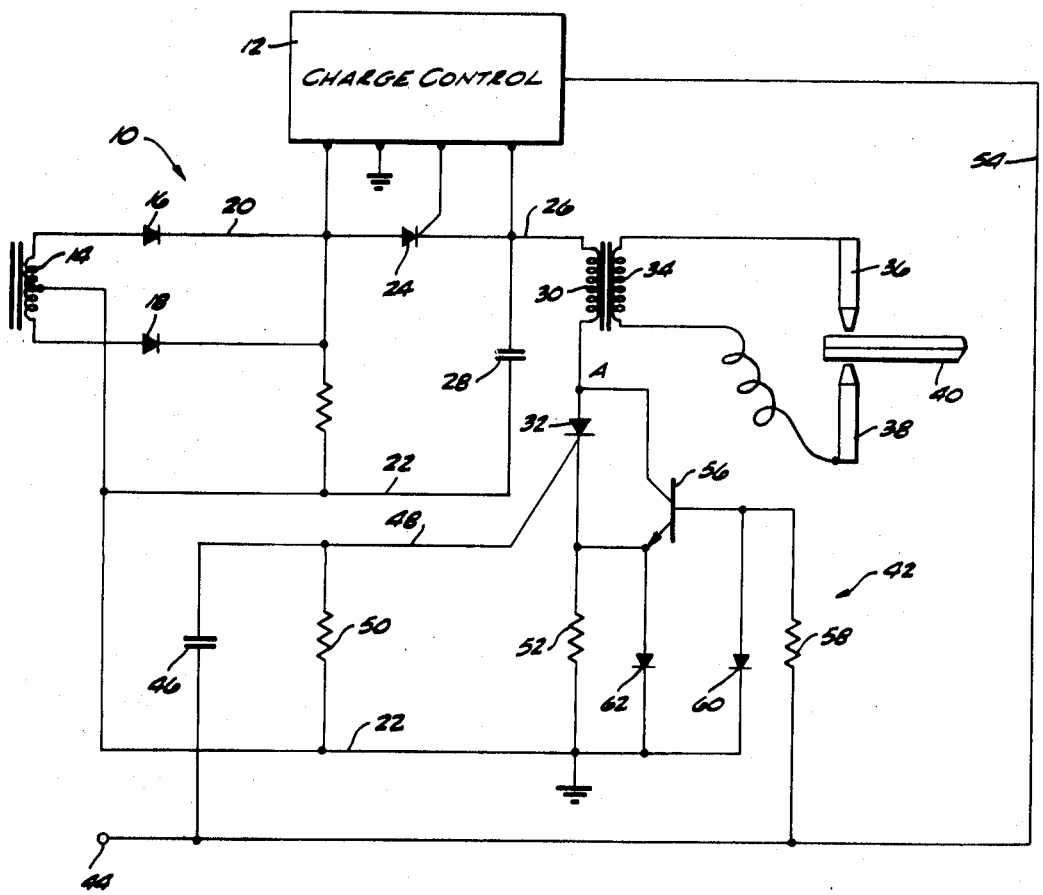

WELD CONTROL CIRCUIT

BACKGROUND

This invention is directed to a weld control circuit and particularly to a circuit for firing an SCR to discharge a capacitor through the primary of a pulse transformer and to turn off the SCR, so that the capacitor may again be charged.

Capacitor welding systems are well known. They employ the charge on a capacitor to supply the energy necessary for welding, and are often employed in other types of heating. Usually a stepdown transformer is employed between the capacitor and the welding electrodes so that capacitors of reasonable capacity may be employed, and high currents at fairly low voltages are obtained at the welding electrodes. The amount of welding energy is related to the voltage to which the capacitor is charged and to the size of the capacitor. After the capacitor is charged, it is discharged through the welding transformer primary, with an SCR employed as a switch. This invention is directed to the control of that SCR, to turn it on and to turn it off.

SUMMARY

In order to aid in the understanding of this invention, it can be stated in essentially summary form that it is directed to a weld control circuit for controlling the SCR which is serially connected with a capacitor and a welding transformer primary. The circuit turns on the SCR and the circuit detects current flow through the SCR, and is connected so that, when this current reaches a low level, a transistor shunting the SCR is turned on to reduce the current through the SCR below its holding current.

Accordingly, it is an object of this invention to provide a control circuit connected to a welding capacitor discharge SCR, to turn the SCR on and, when the current therethrough reaches a reduced value, to shunt the SCR to reduce the current therethrough. It is a further object to employ a transistor as an SCR shunt, with the transistor connected to turn on only when the SCR current is at a reduced value. It is still another object to connect the transistor base and emitter to circuits which raise the emitter voltage above the base voltage to prevent turn-on of the transistor until SCR current is reduced in value. Other objects and advantages of this invention will become apparent from a study of the following portion of the specification, the claims and the attached drawings.

BRIEF DESCRIPTION OF THE DRAWING

The single FIG. of the drawing is a schematic electric circuit diagram of the weld control circuit of this invention.

DESCRIPTION

Referring to the drawing, charging of the weld capacitor is accomplished by a power circuit 10 which is controlled by a charge control circuit 12. Power circuit 10 has a power input including transformer secondary 14. The secondary 14 is energized from any convenient power supply and, for the purposes of illustration, it is assumed that the power supply operates at 60 cycles per second. However, it is clear that this frequency is merely illustrative and any convenient frequency can be employed. Transformer secondary 14 has its extremities connected to diodes 16 and 18, which have their outputs connected together to unregulated positive bus 20. Transformer secondary 14 is center tapped with its center connected to grounded negative bus 22. Bridge or single phase rectifiers could alternatively be employed. Across capacitor 28 is transformer primary 20 which is serially connected through SCR 32. The firing of SCR 32 controls the discharge of capacitor 28 through transformer primary 30.

Transformer secondary 34 is energized by magnetic coupling from primary 30 and has its ends connected to welding electrodes 36 and 38. Preferably, at least one of these electrodes is movable, so that they can be engaged against workpieces 40 for the purpose of welding these workpieces together.

The weld control circuit of this invention is generally indicated at 42. Circuit 42 has an input signal terminal 44. Connected to this terminal is a device which emits a positive pulse which signals the requirement for conduction of SCR 32 with a consequent discharge of capacitor 28 through primary 30, to cause a weld. The input-signaling device could be a simple pushbutton which applies a positive potential to terminal 44 as long as the pushbutton is actuated. However, the input-signaling device is preferably a one-shot multivibrator which has the characteristic of applying the positive pulse for a predetermined length of time. Such can be actuated by any type of manual or automatic control means which signals the welding. In any event, a positive pulse, for example in the order of +5 volts, is applied to terminal 44 as a signal that welding is required. The pulse is sufficiently long to permit the substantial discharge of capacitor 28. The pulse from terminal 44 is differentiated by capacitor 46 which causes line 48 to go positive. This causes conduction of SCR 32 which, in turn, causes discharge of capacitor 28 through primary 30, as is previously described. The line voltage of gate line 48 decays through resistor 50 to ground to, thus, remove the turn-on signal from the gate line. However, SCR 32 will remain conducting as long as the current therethrough, through resistor 52 to the other side of capacitor 28, is above the holding current valve of SCR 32.

Since the turn-on of SCR 32 causes discharge of capacitor 28, in order to prevent overload of the charge control circuit 12, line 54 is connected from input signal terminal 44 to the charge control circuit. The firing signal in line 54 turns off SCR 24, as long as there is a signal in that line. For this reason, it is desirable to have the firing pulse limited in time length.

Transistor 56 is connected with its collector to the anode side of SCR 32 and, with its emitter connected between the cathode of SCR 32 and resistor 52. The base of transistor 56 is connected through resistor 58 to input signal terminal 44. The transistor base is also connected to line 22 through diode 60, while the emitter is connected through diode 62 to line 22. The diodes 60 and 62 act as clamps to limit the voltage respectively of the base and emitter of transistor 56 with respect to ground. These diodes may be zener diodes, or they may be series-connected diodes which employ the normal forward breakdown voltage as the clamp voltage. In the present circuit, as the specific example of values for the circuit, diode 60 is, in fact, a pair of series-connected diodes, each having a 0.6 volt forward breakdown voltage. Thus, the maximum voltage of the base of transistor 56 with respect to ground is +1.2 volts. Similarly, the diode 62 is, in the preferred example, a series connection of three diodes, each having a forward voltage drop of 0.6 volts. Thus, the positive value of the emitter transistor 56 with respect to ground is limited to 1.8 volts.

The table below is a specific example of components of the circuit which will provide an operative circuit, as described in this specification. However, it is clear that these values are merely examples of proper values and other values and similar relationships are also operative and within the scope of this invention.

TABLE

| REFERENCE NO. | COMPONENT | IDENTIFICATION |
| --- | --- | --- |
| 16 | diode | 1N4249 |
| 18 | diode | 1N4249 |
| 24 | SCR | 2N1850 |
| 28 | capacitor | e.g. 1000 μf. 400 v. |
| 32 | SCR | e.g. MCR—2935—7 |
| 30–34 | transformer | turns ratio 500:1 |
| 46 | capacitor | 50μf. 50 v. |
| 50 | resistor | 1KΩ |
| 52 | resistor | 0.068 |
| 56 | transistor | DTS 401 |
| 58 | resistor | 1 KΩ |
| 60 | diode | 2 series–1N1183 |
| 62 | diode | 3 series–1N1183 |

When a positive pulse, for example of about 5 volts, is applied to input signal terminal 44, charge control circuit 12 turns off SCR 24 and the pulse is transmitted through line 48 to turn on SCR 32. This causes current flow through resistor 52. The voltage drop across resistor 52 is limited to a maximum of 1.8 volts by means of diode 62. At the same time, the firing pulse is transmitted through resistor 58 to the base of transistor 56. However, it is clamped at a maximum of 1.2 volts with respect to ground by means of diode 60. Thus, the base-to-emitter junction of transistor 56 is reverse-biased and the transistor is held nonconductive. When the current flow through SCR 32 reduces to a point where the voltage drop across resistor 52 is 1.2 volts, less the base-to-emitter breakdown voltage of transistor 56, the transistor becomes forward-biased to form a shunt around SCR 32. The values are chosen so that, when transistor 56 becomes forward-biased, the amount of charge on capacitor 28 and the amount of current in the system is sufficiently low that the transistor is not overloaded. By this means, a substantial portion of the current is shunted around SCR 32, because the path through the transistor is of lower resistance. By this means, the current flow through SCR 32 is reduced to well below the holding current value of the SCR so that it can revert to its forward-blocking mode. During the discharge process, the positive pulse in line 48 decays through resistor 50 to remove the firing signal from SCR 32 to permit it to go into its forward-blocking mode.

Transistor 56 remains in its conductive mode as long as the positive signal is applied to the input terminal 44. For this reason, the signal is preferably controlled as to length so that transistor 56 is conductive long enough to permit SCR 32 to return to its forward-blocking mode, but is not so long as to hold charge control 12 in the noncharging condition for an excessive length of time. By these means, proper control of SCR 32 is accomplished, including return to its forward-blocking mode.

This invention having been described in its preferred embodiment, it is clear that it is susceptible to numerous modifications as, for instance, the complementary extreme of the arrangement, and embodiments within the ability of those skilled in the art and without the exercise of the inventive faculty.

What is claimed is:

1. A weld control circuit for controlling a welder which includes a serially connected welding capacitor, a welding transformer primary and a controlled rectifier having a gate connection, the improvement comprising:
   switch means connected in parallel to said controlled rectifier for shunting current around said controlled rectifier so that the remaining current through said controlled rectifier is below the holding current value of said controlled rectifier; and
   switch control means for controlling said switch means to close when current through said controlled rectifier is at a selected, reduced value, said switch control means including a resistor connected in series with said controlled rectifier so that the voltage across said resistor is related to the current through said controlled rectifier.

2. A weld control circuit for controlling a welder which includes a serially connected welding capacitor, a welding transformer primary, and a controlled rectifier having a gate connection, the improvement comprising:
   switch means connected in parallel to said controlled rectifier for shunting current around said controlled rectifier so that the remaining current through said controlled rectifier is below the holding current of said controlled rectifier, said switch means comprising a transistor having its collector connected to one side of said controlled rectifier and its emitter connected to the other side of said controlled rectifier so that, upon conduction of said transistor, current is shunted around said controlled rectifier; and
   switch control means for controlling said switch means to close when current through said controlled rectifier is at a selected, reduced value, said switch control means including a resistor connected in series with said controlled rectifier so that the voltage across said resistor is related to the current through said controlled rectifier.

3. The weld control circuit of claim 2 wherein first voltage-limiting means is connected to the emitter of said transistor in parallel to said resistor and second voltage-limiting means is connected to the base of said transistor in parallel to said first voltage control means so that the voltage of the emitter and the voltage of the base of said transistor are controlled and the voltage on the emitter of said transistor results from voltage drop of silicon-controlled rectifier current through said resistor so that said transistor is biased off until the silicon-controlled rectifier current is at a low value.